(12) United States Patent
Imai et al.

(10) Patent No.: US 7,342,715 B2
(45) Date of Patent: Mar. 11, 2008

(54) MULTILAYER FILM REFLECTOR FOR SOFT X-RAYS AND MANUFACTURING METHOD THEREOF

(75) Inventors: Kyoko Imai, Utsunomiya (JP); Kenji Ando, Utsunomiya (JP); Hidehiro Kanazawa, Tokyo (JP); Koji Teranishi, Utsunomiya (JP); Takayuki Miura, Utsunomiya (JP); Kazue Takata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 11/087,679

(22) Filed: Mar. 24, 2005

(65) Prior Publication Data
US 2005/0213199 A1   Sep. 29, 2005

(30) Foreign Application Priority Data
Mar. 26, 2004 (JP) ............................. 2004-091091
Mar. 11, 2005 (JP) ............................. 2005-069167

(51) Int. Cl.
*G02B 5/08* (2006.01)
*G02B 5/20* (2006.01)

(52) U.S. Cl. ...................................... 359/359; 359/360
(58) Field of Classification Search ...................... None
See application file for complete search history.

(56) References Cited

U.S. PATENT DOCUMENTS

| | | | | |
|---|---|---|---|---|
| 4,693,933 A | * | 9/1987 | Keem et al. | 428/333 |
| 5,265,143 A | * | 11/1993 | Early et al. | 378/84 |
| 5,726,805 A | * | 3/1998 | Kaushik et al. | 359/589 |
| 6,449,086 B1 | * | 9/2002 | Singh | 359/361 |
| 2005/0117233 A1 | | 6/2005 | Kanazawa et al. | |
| 2005/0147894 A1 | * | 7/2005 | Lee | 430/5 |
| 2005/0213199 A1 | | 9/2005 | Imai et al. | |

FOREIGN PATENT DOCUMENTS

| | | |
|---|---|---|
| JP | 06-230194 | 8/1994 |
| JP | 08-262198 | 10/1996 |
| JP | 09230098 A * | 9/1997 |
| JP | 11-258396 | 9/1999 |
| WO | WO03032329 A1 * | 4/2003 |

OTHER PUBLICATIONS

Chou et al., Pest disintegration of thin MoSi2 films by oxidation at 500 C, Journal of Materials Science, 1994, vol. 29, Issue 11, pp. 2963-2967.*

S. Bajt, et al., Improved Reflectance and Stability of Mo/Si multilayers, SPIE vol. 4506 (2001) pp. 65-75.*

* cited by examiner

Primary Examiner—Stephone B. Allen
Assistant Examiner—Lee Fineman
(74) Attorney, Agent, or Firm—Fitzpatrick, Cella, Harper & Scinto (57) ABSTRACT

A multilayer film reflector for X-rays has alternately stacked layers formed on a substrate and comprising a layer (high refractive index layer) comprising a material having a large difference between a refractive index to soft X-ray and a refractive index in vacuum, and a layer (low refractive index layer) comprising a material having a small difference between a refractive index to soft X-ray and a refractive index in vacuum, wherein at least one intermediate layer having a crystalline structure is provided between the low refractive index layer and the high refractive index layer. Thereby, the crystallization of the low refractive index layer is promoted, the refractive index of the low refractive index layer is lowered, so that the reflectance of the multilayer film reflector is improved.

4 Claims, 6 Drawing Sheets

MULTILAYER FILM REFLECTOR FOR SOFT X-RAYS AND MANUFACTURING METHOD THEREOF

BACKGROUND OF THE INVENTION

1. Field of the Invention

The present invention relates to a multilayer film reflector and a manufacturing method thereof, and particularly to a multilayer film reflector having good reflection characteristics in a soft X-ray region of a wavelength of about 1 to 30 nm, and the manufacturing method thereof. The multilayer film reflector in accordance with the present invention is used in various X-ray optical systems. For instance, it can be used in X-ray lithography, an X-ray telescope and an exposure device.

2. Description of the Related Art

In general, a complex index of refraction for a material is expressed by the equation $n = 1-\delta-ik$ (wherein n is complex index of refraction; $\delta$ and k are real numbers; and k represents absorption of X-ray). The values of $\delta$ and k in the equation are much smaller than 1 in a soft X-ray region (wavelength: 1 to 30 nm), so that the complex index of refraction becomes a value extremely close to 1. That is, a light hardly refracts in the soft X-ray region so hardly such that a dioptric system utilizing refraction cannot be theoretically used.

For this reason, a catoptric system (a reflector) utilizing reflection needs to be used in the soft X-ray region. However, when a reflector having a single layer film formed therein is used as the catoptric system, if an incidence angle of a soft X-ray incident on the reflector is small, the reflectance of the reflector becomes extremely low. This is because a marginal angle at which a soft X-ray incident on the reflector is totally reflected (critical angle: $\theta c$) is small, such that, for example, the critical angle is 70° or more for a soft X-ray having a wavelength of 10 nm. Specifically, when the reflector is used for an incidence angle of 70° or less, the reflectance for the soft X-rays is so low that the reflector cannot be used.

For this reason, hitherto, for a reflector for the soft X-ray, a multilayer film reflector having two different material layers alternately stacked on each other has been used. In the multilayer film reflector, a layer (high refractive index layer) of a substance having a relatively small difference between a refractive index for a wavelength of a soft X-ray used and a refractive index in vacuum (=1), and a layer (low refractive index layer) of a substance having a relatively large difference between the above refractive indices are alternately stacked on each other in a plurality of layers, with each layer having such an extremely small optical thickness as to be less than a wavelength of an incident soft X-ray. By alternately stacking tens or more of low refractive index layers and high refractive index layers, tens or more of interfaces are formed which are reflecting surfaces for an X-ray of the wavelength used. At this time, if the thickness of each of the low refractive index and the high refractive index layers is designed such that the phases of reflected lights from respective interfaces can coincide, with the use of an optical interference theory, the reflector can develop good reflection characteristics even for a soft X-ray perpendicularly incident on a reflecting surface.

For the combination of a low refractive index layer (refractive index: $n_A$) and a high refractive index layer (refractive index: $n_B$), by selecting those two materials which each have as small an absorption coefficient as possible and have as large a difference between $n_A$ and $n_B$ as possible, a multilayer film reflector having a higher reflectance can be obtained. The combination of two such materials can be selected from several examples. Japanese Patent Application Laid-Open No. H08-262198 discloses a multilayer film reflector which employs Mo for a low refractive index layer and Si a high refractive index layer, and also that an alternate multilayer film of Mo and Si is a substance pair that shows the highest reflectance at a wavelength of 13 nm in the X-ray region. Further, in Japanese Patent Application Laid-Open No. H11-258396, a multilayer film reflector is described which employs Mo for a low refractive index layer and Be for a high refractive index layer. Moreover, in Japanese Patent Application Laid-Open No. H06-230194, a multilayer film reflector is described which employs Ni for a low refractive index layer and C60 or C for a high refractive index layer.

Figure 4:
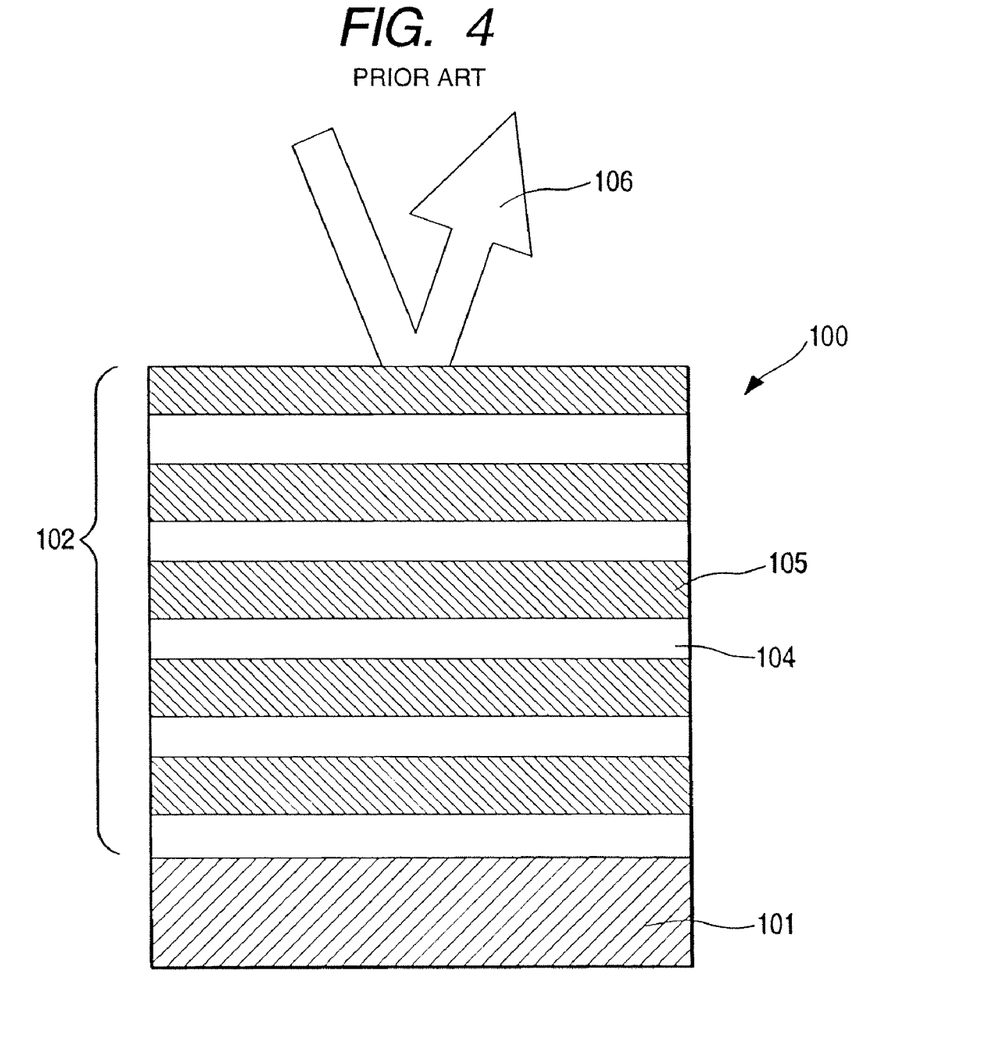
FIG. 4 is a sectional view showing a multilayer film reflector of the prior art.

FIG. 4 is a sectional view of a conventional multilayer film reflector 100. In FIG. 4, reference numeral 101 denotes a substrate made of Ni. On the substrate 101, high refractive index layers 104 made of Si (having a refractive index $n_A$ of 0.999 in a crystalline state and a thickness of about 5 nm), and low refractive index layers 105 made of Mo (having a refractive index $n_A$ of 0.921 in the crystalline state and a thickness of about 4 nm) are stacked. The thickness of each refractive index layer is differently designed according to the order of the formed refractive index layer. The high refractive index layers 104 and the low refractive index layers 105 are alternately stacked into 60 layers to form a multilayer film 102. However, in FIG. 4, the multilayer film 102 is shown as being formed of ten layers for convenience of the description.

Figure 5:
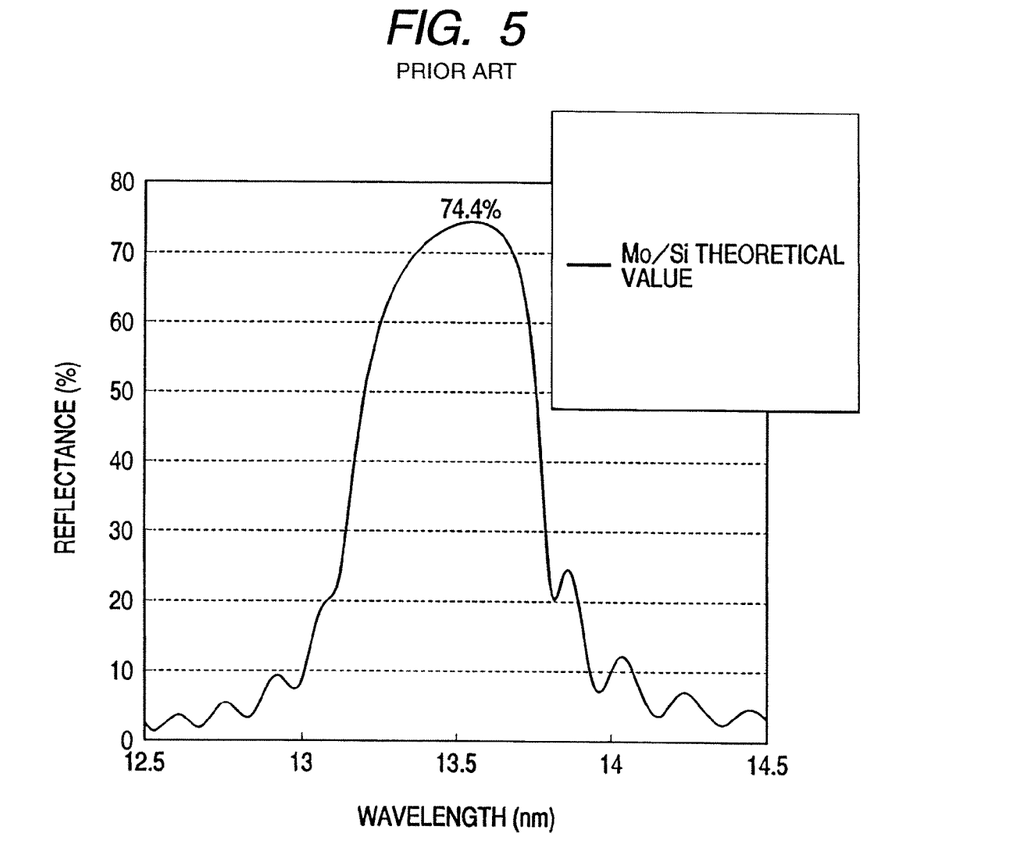
FIG. 5 is a graphical representation showing theoretical values of the reflection characteristics of the multilayer film reflector of the structure shown in FIG. 4.

In FIG. 4, the thicknesses and number of the refractive index layers are designed so that the reflector can show the highest reflectance when a soft X-ray with a wavelength of 13.5 nm is incident on the reflector at an incidence angle of 20°. The reflection characteristics when an X-ray 106 with a wavelength of 12.5 to 14.5 nm was incident on the multilayer film reflector 100 at an incidence angle of 20° were determined by a simulation and are shown in FIG. 5. It can be seen from FIG. 5 that the multilayer film reflector 100 has such a very high reflectance as 74.4% to an X-ray with a wavelength of 13.5 nm.

Figure 6:
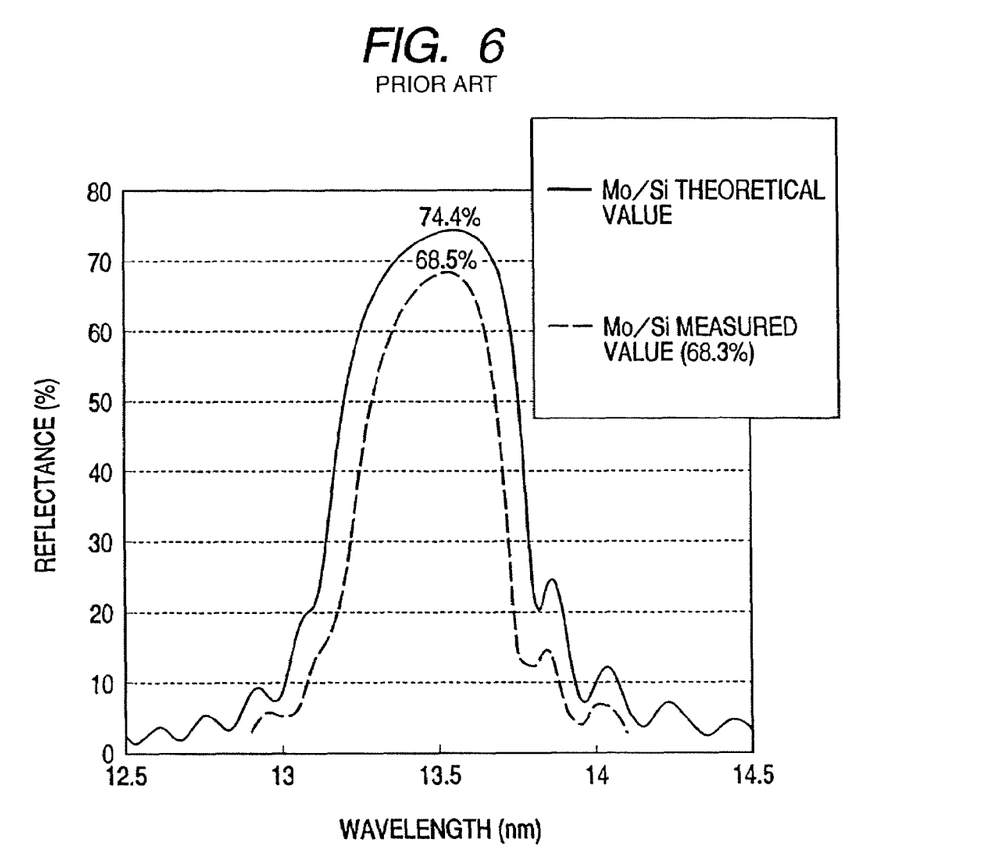
FIG. 6 is a graphical representation showing measured values of the reflection characteristics of the multilayer film reflector of the structure shown in FIG. 4.

The multilayer film reflector 100 of the structure shown in FIG. 4 was actually manufactured, and the reflection characteristics thereof were measured to obtain the result shown as measured values in FIG. 6. In FIG. 6, the theoretical values shown in FIG. 5 are also shown.

It can be seen by comparing the measured values and the theoretical values shown in FIG. 6 to each other that the measured reflectance values are remarkably lower than the theoretical reflectance values obtained from the simulation shown in FIG. 5. Particularly, the measured value to the X-ray with the wavelength of 13.5 nm is as low as 68.5%, which is 5.9% lower than the theoretical value.

The present inventors have studied the reason why the measured reflectance values of the multilayer film reflector 100 shown in FIG. 4 were lowered in comparison with the theoretical values. As a result, the present inventors have found that the refractive index values of Mo constituting the low refractive index films are higher than the theoretical values. Such higher refractive index value of Mo constituting the low refractive index film, resulted in a reduction of the difference in refractive index value between Mo and Si constituting the high refractive index film, whereby the reflectance of the multilayer film reflector 100 was lowered. The details of the study will be now shown below.

At first, Si layers as high refractive index films 105 were in an amorphous state when formed into films on the substrate 101 by sputtering. This is because the interatomic bonding strength of Si is so low that when an Si film is formed by an energy normally used in the sputtering, the crystal lattice is destroyed to form an amorphous structure. In general, the refractive index of an amorphous substance is known to be higher than the refractive index of the substance that is in a crystalline state. The refractive index of Si in a crystalline state is known to be 0.999, so that the refractive index of Si in an amorphous state is considered to be closer to 1 than the refractive index of Si in the crystalline state.

In contrast to this, Mo layers as the low refractive index layers 104 are in an amorphous state as with the Si layers, when formed into films on the high refractive index films 105 by the sputtering. However, because the interatomic bonding strength of Mo is much higher than that of Si, the crystal lattice is gradually restructured immediately after the film formation, so that the crystallization proceeds. Theoretically, the crystallization will proceed to be completed, and the refractive index of the Mo layers should become 0.921 that is the value for a complete crystal. However, the refractive index of the Mo film at the time of completion of the film formation was measured and found to be 0.935. The fact is considered to mean that the formed Mo films are in a quasicrystalline state in which crystallization is not completed.

In addition, as a result of observation of the state of the formed Mo layer through a sectional TEM (transmission electron microscope) image, it was found that the crystallization ratio of the Mo layer in the vicinity of an interface with the Si layer on the substrate 101 side was extremely low, and the crystallization ratio gradually increased toward an interface on the side opposite to the Si layer side. That is, it is considered that the crystallization of the formed Mo layer in the amorphous state is prevented by the Si layer in the amorphous state that functions as a substrate when the Mo layer is formed. It was also found that for this reason, the difference in refractive index between the Mo layer as low refractive index layer and the Si layer as high refractive index layer becomes smaller than a theoretical value, whereby the theoretically derived reflection characteristics could not be obtained from the theory.

SUMMARY OF THE INVENTION

It is, therefore, an object of the present invention to provide a multilayer film reflector having good reflection characteristics also in a soft X-ray region, by promoting crystallization of a low refractive index layer to decrease the refractive index thereof, thereby increasing the difference in refractive index between the low refractive index layer and a high refractive index layer.

In order to resolve the above-described problems, according to an aspect of the present invention, there is provided a multilayer film reflector for soft X-rays comprising on a substrate, a plurality of layers comprising a high refractive index layer with a relatively high refractive index and a low refractive index layer with a relatively low refractive index alternately stacked on each other, wherein an intermediate layer having a crystalline structure is disposed at interface(s) on a side opposite to the substrate side of the high refractive index layers, of interfaces between the high refractive index layers and the low refractive index layers.

In the present invention, it is preferred that the high refractive index layer comprises a film having an amorphous structure and the low refractive index layer comprises a film having a quasicrystalline structure.

According to another aspect of the present invention, there is provided a multilayer film reflector for soft X-rays comprising on a substrate, a plurality of layers comprising a high refractive index layer with a relatively high refractive index and a low refractive index layer with a relatively low refractive index alternately stacked on each other, wherein an intermediate layer having a crystalline structure is disposed in at least one of the interfaces between the high refractive index layers and the low refractive index layers.

The above and other objects of the invention will become more apparent from the following description taken in conjunction with the accompanying drawings.

DETAILED DESCRIPTION OF THE PREFERRED EMBODIMENTS

Embodiments of the present invention will be now described below.

EXAMPLE 1

Figure 1:
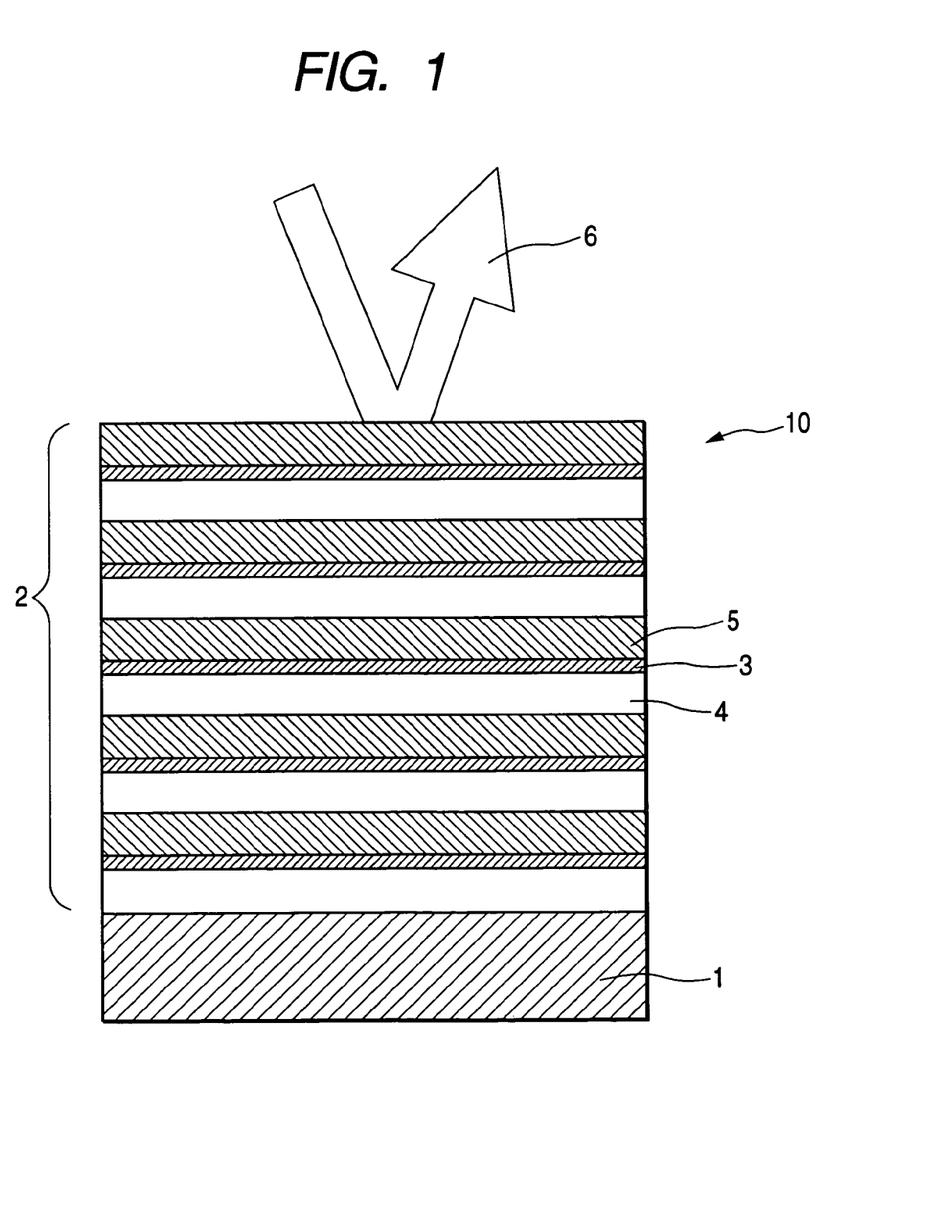
FIG. 1 is a sectional view showing a multilayer film reflector of Example 1.

At first, the configuration of a multilayer film reflector of Example 1 will be described with reference to a sectional view shown in FIG. 1. In FIG. 1, reference numeral 1 denotes a substrate made of Ni. On the substrate 1, a high refractive index layer 4 made of Si (having a refractive index $n_B$ of 0.999 in a crystalline state and a thickness of 5 nm), an intermediate layer 3 made of Zr (having a thickness of 1 nm), and a low refractive index layer 5 made of Mo (having the refractive index $n_A$ of 0.921 in a crystalline state and the thickness of 4 nm) are stacked. A multilayer film 2 is formed by repeatedly stacking 60 layers in total of the high refractive index layer 4, the intermediate layer 3 and the low refractive index layer 5 in the mentioned order from the substrate 1 side. However, in FIG. 1, the multilayer film 2 is shown as being formed of 15 layers for convenience of the description. In FIG. 1, the thicknesses and number of the refractive index layers are designed such that the reflector can show the highest reflective index when a soft X-ray with a wavelength of 13.5 nm is incident on the reflector at an incidence angle of 20°, according to the optical interference theory.

In the next place, a method of manufacturing a multilayer film reflector 10 shown in FIG. 1 will be described.

At first, by a sputtering method using Si as a target, a high refractive index layer 4 is formed of Si on a substrate 1 made of Ni in a thickness of 5 nm. At this time, the formed Si layer has an amorphous structure.

Subsequently, by a sputtering method using a Zr target, an intermediate layer 3 of Zr is formed on the high refractive index layer 4 in a thickness of 1 nm. At this time, the formed Zr layer has a crystalline structure.

Then, by a sputtering method using a Mo target, a low refractive index layer 5 of Mo is formed on the intermediate layer 3 in a thickness of 4 nm. The Mo layer has an amorphous structure immediately after the film formation, but the crystallization starts at once to form a quasicrystalline structure. As a result of having observed the formed Mo layer through a TEM (transmission electron microscope) image, it was confirmed that the ratio of the Mo crystal lattice in the Mo layer evidently increased in comparison with the Mo layer of a multilayer film reflector having no intermediate layer shown in FIG. 4 therein. The reason is considered that because the Mo layer is formed on the intermediate layer made of Zr, the crystallization proceeds without being hindered by the Si layer in an amorphous state.

Similarly, a low refractive index layer 4, an intermediate layer 3 and a high refractive index layer 5 are sequentially formed in the mentioned order to form a multilayer film having 60 layers stacked.

Figure 2:
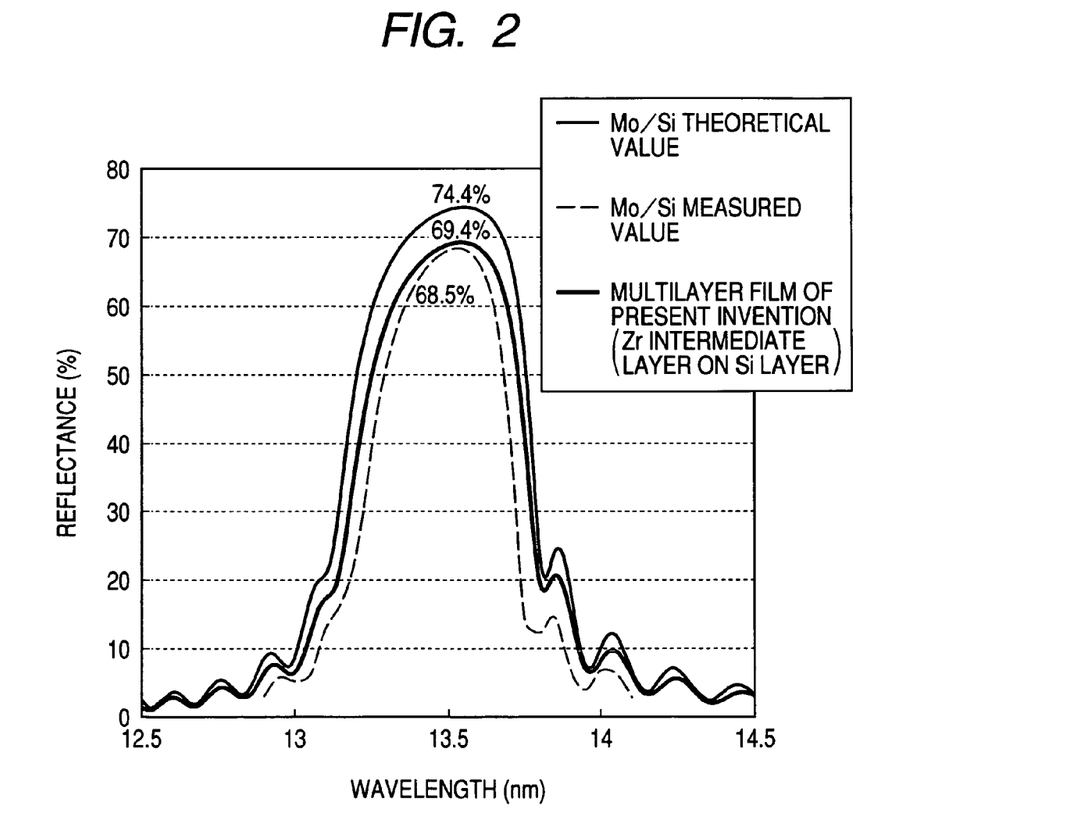
FIG. 2 is a graphical representation showing the reflection characteristics of the multilayer film reflector of Example 1.

The multilayer film reflector 10 shown in FIG. 1 was irradiated with X-ray 6 having a wavelength of 12.5 to 14.5 nm at an incidence angle of 20°, and the reflection characteristics was measured. The result is shown in FIG. 2. In FIG. 2, the theoretical values shown in FIG. 5 are also shown together with measured values shown in FIG. 6.

As can be seen from FIG. 2, the reflectance of the multilayer film reflector 10 having the above-described intermediate layers 3 interposed, measured at a wavelength of 13.5 nm is higher by 0.9% than that measured for the multilayer film reflector shown in FIG. 4. The reflectance value of 0.9% has a great influence on optical design, so that it becomes possible to increase the degree of freedom of design including selection of materials and film thicknesses for the respective refractive index films and the like.

EXAMPLE 2

Figure 3:
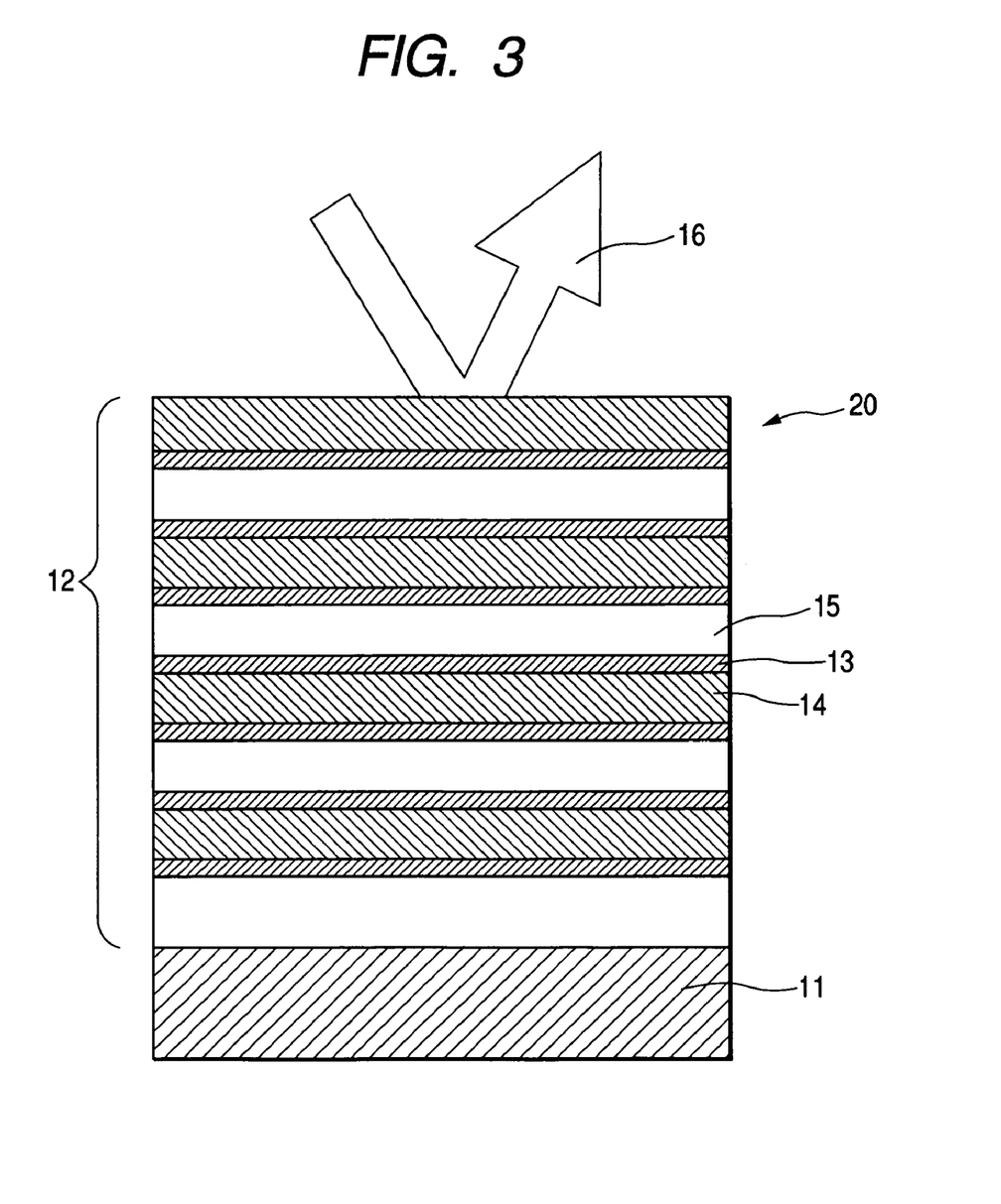
FIG. 3 is a sectional view showing a multilayer film reflector of Example 2.

The configuration of a multilayer film reflector of Example 2 will be now described with reference to a sectional view of FIG. 3. In FIG. 3, in contrast to FIG. 1, an intermediate layer is formed in each of interfaces between high refractive index layers and low refractive index layers.

In FIG. 3, reference numeral 11 denotes a substrate made of Cu. On the substrate 11, high refractive index layers 14 made of Si (having a refractive index $n_A$ of 0.999 in a crystalline state and a thickness of about 4.5 nm), intermediate layers 13 made of Zr (having a thickness of about 1 nm), and low refractive index layers 15 made of Mo (having a refractive index $n_A$ of 0.921 in a crystalline state and a thickness of about 4 nm) are stacked. A multilayer film 12 is formed by repeatedly stacking 50 layers in total of a high refractive index layer 14, an intermediate layer 13, a low refractive index layer 15, and an intermediate layer 13 in the mentioned order from the substrate 11 side. However, in FIG. 3, the multilayer film 12 is shown as being formed of 18 layers for convenience of the description. In FIG. 3, the thicknesses and number of the individual refractive index layers are designed such that the reflector can show the highest reflectance when a soft X-ray with a wavelength of 13.5 nm is incident on the reflector at an incidence angle of 20°, according to the optical interference theory.

In FIG. 3, the intermediate layer 13 provided on an upper surface of the high refractive index layer 14 and on a lower surface of the low refractive index layer 15, as with Example 1 shown in FIG. 1, when forming the low refractive index layer 15 on the high refractive index layer 14, prevents the Si layer in an amorphous state as the high refractive index layer 14 from hindering the crystallization of the Mo layer as the low refractive index layer 15. This makes it possible to make lower the refractive index of the Mo layer, thereby improving the reflectance of a multilayer film reflector 20.

In addition, the intermediate layer 13 provided on a lower surface of the high refractive index layer 14 and on an upper surface of the low refractive index layer 15 prevents the Mo layer in a quasicrystalline state as the low refractive index layer 15 from crystallizing the Si layer as the high refractive index layer 14. This makes it possible to make higher the refractive index of the Si layer, specifically closer to 1, thus improving the reflectance of a multilayer film reflector 20.

Incidentally, in the present invention, the thicknesses and number of the individual refractive index layers are designed such that the reflector can show the highest reflectance depending on the incidence angle of an applied soft X-ray. Accordingly, with the increasing incidence angle of the X-ray incident on the multilayer film reflector 10, the thicknesses of the low refractive index layers and the high refractive index layers need to be designed larger. Accordingly, when the incidence angle is 70° to 80°, the thickness of each refractive index layer should be 10 to 15 nm, and the film thickness corresponding to one cycle of low refractive index layer→high refractive index layer→intermediate layer must be 25 to 30 nm.

When the incidence angle increases, the film thickness of an Mo layer also has to increase, so that the crystallization ratio of the Mo layer has a great influence on the reflection characteristics. Accordingly, it becomes very important to provide an intermediate layer as shown in Example 1.

Although the above description was made by exemplifying the case of employing a Mo layer for a low refractive index layer, a Zr layer for an intermediate layer, and a Si layer for a high refractive index layer, the present invention is not limited thereto and is also applicable to other materials.

As the material of the low refractive index layer, there may be used those which have a high interatomic bonding strength and change to a quasicrystalline state from an amorphous state after film formation. Specifically, the material can be selected from metals, alloys and compounds comprising an element belonging to Group 6 of the periodic table. The elements belonging to Group 6 include Mo, W, etc. Compounds thereof include $ZrMo_2$, $MoSi_2$, Mo—Ru, etc.

As the material of the high refractive index layer, there may be used those which have a low interatomic bonding strength and stably exist in an amorphous state after film formation. The material can be selected from metals, alloys and compounds comprising an element belonging to Group 14 of the periodic table. The elements belonging to Group 14 include C, Si, etc.

Further, as for the combination of a high refractive index layer and a low refractive index layer, a larger difference in refractive index can more improve the reflection characteristics of a multilayer film reflector. For instance, the combination of an Mo layer for the low refractive index layer and a Be layer for the high refractive index layer, and the combination of a Ni layer for the low refractive index layer and a C layer for the high refractive index layer can be said to be combinations having a large difference in refractive index.

As the material of the intermediate layer, there may be used those which have a high interatomic bonding strength and are in a stable crystalline state after having been formed into a film. The material is preferably a metal, alloy or compound comprising at least one element selected from the group consisting of V, Mo, Nb, Zr, Be, Mg, Ti, Zn, Ag, Al, Au, Si, Ca, Cu, Ni, Pb, Pt, Ba, Cr, Fe, and W.

Particularly, by selecting an intermediate layer material and a low refractive index layer material having the same crystalline structure, the crystallinity of the low refractive index layer can further be improved. The crystalline structure of the intermediate layer is preferably selected, in consideration of the structure of the low refractive index layer, from a body-centered cubic structure, a face-centered cubic structure, a hexagonal closest-packed structure, a diamond structure, a NaCl structure, and the like. Furthermore, the principal axis of the crystalline structure is further preferably selected, in consideration of the structure of the low refractive index layer, from those with [111], [110] or [001] direction.

In addition, when the high refractive index layer is made of Si, making the intermediate layer of Si crystal makes it possible to form the intermediate layer only by changing film-forming conditions for the high refractive index layer, which enhances the productivity. Incidentally, when the Si layer of the intermediate layer is crystallized, the bonding strength between Si atoms is high, so that even when an Mo layer is formed on the Si layer, the Si layer will not hinder the crystallization of Mo.

Further, as the material of the substrate, there are preferably used those having a high thermal conductivity, and Si, Cu, Ag and the like can be used, in addition to Ni.

Moreover, the high refractive index layer, low refractive index layer and intermediate layer can be formed by means of a thin film forming technique such as a vacuum deposition method, a CVD method, a magnetron sputtering method, an EB vacuum deposition method, an ion beam sputtering method and the like, in addition to a sputtering method.

This application claims priority from Japanese Patent Application Nos. 2004-091091 filed Mar. 26, 2004 and 2005-069167 filed Mar. 11, 2005, which are hereby incorporated by reference herein.

What is claimed is:
1. A multilayer film reflector for soft X-rays comprising:
   a substrate;
   a plurality of layers alternately stacked on the substrate comprising a high refractive index layer with an amorphous structure having a relatively high refractive index and a low refractive index layer with a crystalline structure having a relatively low refractive index; and
   an intermediate layer having the same crystalline structure as that of the low refractive index layer and disposed at at least one of interfaces on a side opposite to the substrate side of the high refractive index layer, between the high refractive index layer and the low refractive index layer,
   wherein the intermediate layer comprises a metal, alloy, or compound comprising at least one element selected from the group consisting of V, Nb, Zr, Be, Mg, Ti, Zn, Ag, Al, Au, Ca, Cu, Ni, Pb, Pt, Ba, Cr, Fe, and W.

2. The multilayer film reflector for soft X-rays according to claim 1, wherein the high refractive index layer comprises silicon, the low refractive index layer comprises molybdenum having a body-centered cubic structure, and the intermediate layer has a body-centered cubic structure.

3. The multilayer film reflector for soft X-rays according to claim 2, wherein the intermediate layer comprises a metal, alloy, or compound comprising at least one element selected from the group consisting of V, Nb, Ba, Cr, Fe, and W.

4. A multilayer film reflector for soft X-rays comprising:
   a substrate;
   a plurality of layers alternately stacked on the substrate comprising a high refractive index layer with an amorphous structure having a relatively high refractive index and a low refractive index layer with a crystalline structure having a relatively low refractive index; and
   an intermediate layer having the same crystalline structure as that of the low refractive index layer disposed at each of interfaces between the high refractive index layers and the low refractive index layers,
   wherein the intermediate layer comprises a metal, alloy, or compound comprising at least one element selected from the group consisting of V, Nb, Zr, Be, Mg, Ti, Zn, Ag, Al, Au, Ca, Cu, Ni, Pb, Pt, Ba, Cr, Fe, and W.

* * * * *

UNITED STATES PATENT AND TRADEMARK OFFICE
CERTIFICATE OF CORRECTION

PATENT NO. : 7,342,715 B2  Page 1 of 1
APPLICATION NO. : 11/087679
DATED : March 11, 2008
INVENTOR(S) : Imai et al.

It is certified that error appears in the above-identified patent and that said Letters Patent is hereby corrected as shown below:

TITLE PAGE:
Foreign Patent Document, "WO03032329 A1 * 4/2003" should read --WO 03/032329 A1 * 4/2003--.

Foreign Patent Document, "JP 09230098 a * 9/1997" should read --JP 09-230098 A * 9/1997--.

Other Publications, "Chou et al., Pest disintegration of thin MoSi2 films by oxidation at 500 C, Journal of Materials Science, 1994, vol. 29, Issue 11, pp. 2963-2967." should read --Chou, et al., Pest disintegration of thin $MoSi_2$ films by oxidation at 500°C, Journal of Materials Science, 1994, vol. 29, Issue 11, pp. 2963-2967.*--.

ABSTRACT:
Line 2, "comprising" should read --comprises--.

COLUMN 1:
Line 25, Delete "sohardly".
Line 53, "tens" should read --ten--.
Line 54, "tens" should read --ten--.
Line 64, "index: $_A$)" should read --index:n $_A$)--.

COLUMN 2:
Line 6, "Si" should read --Si for--.

COLUMN 5:
Line 27, "was" should read --were--.

Signed and Sealed this

Seventeenth Day of February, 2009

JOHN DOLL
*Acting Director of the United States Patent and Trademark Office*